United States Patent
Wu et al.

(10) Patent No.: US 11,866,370 B2
(45) Date of Patent: Jan. 9, 2024

(54) GRAIN-GRADE ZIRCONIA TOUGHENED ALUMINA CERAMIC SUBSTRATE AND METHOD FOR PREPARING THE SAME

(71) Applicant: Sinoceram Technology (zhengzhou) Co., Ltd., Henan (CN)

(72) Inventors: Chongjun Wu, Henan (CN); Mingxin Duan, Henan (CN); Yunpeng He, Henan (CN)

(73) Assignee: Sinoceram Technology (zhengzhou) Co., Ltd., Zhengzhou (CN)

( * ) Notice: Subject to any disclaimer, the term of this patent is extended or adjusted under 35 U.S.C. 154(b) by 196 days.

(21) Appl. No.: 17/398,911

(22) Filed: Aug. 10, 2021

(65) Prior Publication Data

US 2022/0402821 A1 Dec. 22, 2022

Related U.S. Application Data

(63) Continuation of application No. PCT/CN2021/101514, filed on Jun. 22, 2021.

(51) Int. Cl.

| | |
|---|---|
| *C04B 35/119* | (2006.01) |
| *C04B 35/488* | (2006.01) |
| *C04B 35/10* | (2006.01) |
| *C04B 35/626* | (2006.01) |
| *C04B 35/634* | (2006.01) |
| *C04B 35/64* | (2006.01) |

(52) U.S. Cl.
CPC .......... *C04B 35/10* (2013.01); *C04B 35/6261* (2013.01); *C04B 35/6264* (2013.01); *C04B 35/6342* (2013.01); *C04B 35/64* (2013.01); *C04B 2235/3217* (2013.01); *C04B 2235/3222* (2013.01); *C04B 2235/3246* (2013.01); *C04B 2235/6025* (2013.01); *C04B 2235/6567* (2013.01)

(58) Field of Classification Search
CPC .......................... C04B 35/119; C04B 35/4885
See application file for complete search history.

(56) References Cited

U.S. PATENT DOCUMENTS

| | | | | |
|---|---|---|---|---|
| 7,820,577 B2 * | 10/2010 | Shikata | ................... | C04B 35/64 |
| | | | | 428/472 |
| 2014/0155248 A1 * | 6/2014 | Quadir | ................... | C04B 35/64 |
| | | | | 501/135 |

FOREIGN PATENT DOCUMENTS

| | | |
|---|---|---|
| CN | 1793010 A | 6/2006 |
| CN | 105881700 A | 8/2016 |
| CN | 107124880 A | 9/2017 |

(Continued)

*Primary Examiner* — Karl E Group

(57) ABSTRACT

A grain-grade zirconia toughened alumina ceramic substrate and a method for preparing the same. The ceramic substrate is prepared from alumina power (main phase) and zirconia powder (secondary phase) in a binary azeotrope of anhydrous ethanol and butanone in the presence of magnesia-alumina spinel powder (as sintering aid), phosphate ester (as dispersant), polyvinyl butyral (as binder) and dibutyl phthalate (as plasticizer). In a mixture of the alumina power and the zirconia powder, a volume percentage of the alumina power is 82.44-96.7%, and a volume percentage of the zirconia powder is 3.30-17.56%. The magnesia-alumina spinel powder is 0.1-4.0% by weight of the mixture of the alumina power and the zirconia powder. A particle size ratio of the alumina powder to the zirconia powder is 2.415-4.444.

5 Claims, 6 Drawing Sheets

(56) References Cited

FOREIGN PATENT DOCUMENTS

| | | | |
|---|---|---|---|
| CN | 107922274 | A | 4/2018 |
| CN | 108727001 | A | 11/2018 |
| CN | 109906212 | A | 6/2019 |
| EP | 1637507 | A2 | 3/2006 |

* cited by examiner

GRAIN-GRADE ZIRCONIA TOUGHENED ALUMINA CERAMIC SUBSTRATE AND METHOD FOR PREPARING THE SAME

CROSS-REFERENCE TO RELATED APPLICATIONS

This application is a continuation of International Patent Application No. PCT/CN2021/101514, filed on Jun. 22, 2021, which claims the benefit of priority from Chinese Patent Application No. 202010410660.2, filed on May 15, 2020. The content of the aforementioned applications, including any intervening amendments thereto, is incorporated herein by reference in its entirety.

TECHNICAL FIELD

This application relates to preparations of electronic ceramic substrates, particularly to a zirconia toughened alumina (ZTA) ceramic substrate with high bending strength and fracture toughness and excellent electrical performance, and more particularly to a grain-grade ZTA ceramic substrate and a method for preparing the same, in which $ZrO_2$ plays a toughening role without causing leakage current. Moreover, the grain-grade ZTA ceramic substrate can meet mechanical and electrical performance requirements of a ZTA ceramic copper-clad substrate and a heating element.

BACKGROUND

Zirconia toughened alumina (ZTA) ceramics are a composite ceramic material with $Al_2O_3$ as a matrix and partially stabilized $ZrO_2$ as a toughening phase. The ZTA ceramics have intermediate mechanical properties between $Al_2O_3$ ceramics and $ZrO_2$ ceramics. Specifically, the ZTA ceramics retain the high hardness and wear resistance of $Al_2O_3$ ceramics, and simultaneously have good fracture toughness and high bending strength of $ZrO_2$ ceramics. In addition, they have a relatively lower cost than the $ZrO_2$ ceramics. In the ZTA ceramics, since the thermal expansion coefficient of $ZrO_2$ is greater than that of $Al_2O_3$, and the sintering temperature of $ZrO_2$ is lower than that of $Al_2O_3$, the $ZrO_2$ grains are in a tensile-stress state after sintering, which is conducive to the martensitic transformation of $ZrO_2$ from tetragonal phase to monoclinic phase. The shear stress and volume expansion brought by the phase transformation produce compressive strain on the matrix, such that the crack propagation requires greater energy and force, increasing the toughness of the ZTA ceramic substrate. Since the ZTA ceramics have good heat dissipation, insulation, thermal shock resistance and mechanical strength, ZTA ceramic copper-clad substrates and heating elements are widely used in pressure sensors, insulated gate bipolar transistor (IGBT) packaging, DC-AC inverters and electronic cigarettes.

Generally, the direct bonded copper (DBC) copper clad laminate uses an alumina ceramic substrate as the carrier, and has a bending strength of about 380 MPa. When the thickness of the copper layer is 300 μm, the DBC copper clad laminate can experience about 50 heat cycles at −55-150° C. When the ZTA ceramic substrate is used in the DBC circuit board, since the bending strength of the ZTA ceramic substrate is more than 750 MPa, which is twice as high as that of a 96% alumina ceramic substrate, the DBC circuit board can withstand higher current carrying capacity even at a copper layer thickness of 100-500 μm. When the thickness of the copper layer reaches 300 μm, the DBC circuit board can experience more than 200 heat cycles at −55-150° C. Moreover, the starting power that the ZTA ceramic heating element can withstand is more than three times the starting power that the 96% $Al_2O_3$ ceramic heating element can withstand.

However, in addition to acting as a toughening phase, $ZrO_2$ is also a conductive phase in the ZTA ceramic. When the content of $ZrO_2$ exceeds a certain level, the ZTA ceramic copper-clad circuit board will suffer leakage current, and the heating element will be broken down. The macroscopic properties of a ceramic material are determined by its composition and microstructure. In view of this, an ideal material can be made by designing the composition and grain structure. In summary, there is an urgent need to develop a method for preparing a ZTA ceramic substrate, which can not only ensure the toughening effect of $ZrO_2$ without causing leakage current, but also meet mechanical and electrical performance requirements of the ZTA ceramic copper-clad substrates and heating elements.

SUMMARY

An object of the present disclosure is to provide a grain-grade zirconia toughened alumina (ZTA) ceramic substrate and a method for preparing the same to overcome the shortcomings in the prior art, where a reasonable $ZrO_2$ content and an optimal particle size ratio of $ZrO_2$ grain to $Al_2O_3$ grain are determined according to a formula derived based on the Weaire-Phelan structure and the cubic close packing principle. The preparation adopts tape casting and atmospheric sintering techniques.

The technical solutions of the present disclosure are described as follows.

In a first aspect, the present disclosure provides a grain-grade zirconia toughened alumina ceramic substrate, wherein the grain-grade zirconia toughened alumina ceramic substrate is prepared from a main phase material and a secondary phase material in a solvent in the presence of a sintering aid, a dispersant, a binder and a plasticizer;

- the main phase material is an alumina powder;
- the secondary phase material is a zirconia powder;
- the sintering aid is a magnesia-alumina spinel powder;
- the solvent is a binary azeotrope of anhydrous ethanol and butanone;
- the dispersant is a phosphate ester;
- the binder is polyvinyl butyral;
- the plasticizer is dibutyl phthalate;
- the alumina powder accounts for 82.44-96.7% of a total volume of the alumina powder and the zirconia powder, and the zirconia powder accounts for 3.30-17.56% of the total volume of the alumina powder and the zirconia powder;
- a weight of the magnesia-alumina spinel powder is 0.1-4.0% of a total weight of the alumina powder and the zirconia powder;
- the alumina powder, the zirconia powder and the magnesia-aluminum spinel powder constitute an inorganic powder;
- the binary azeotrope of anhydrous ethanol and butanone is 20-35% by weight of the inorganic powder;
- the phosphate ester is 0.5-2.0% by weight of the inorganic powder;
- the polyvinyl butyral is 5-15% by weight of the inorganic powder; and
- the dibutyl phthalate is 2-6% by weight of the inorganic powder.

In some embodiments, the zirconia powder accounts for 8.57% of the total volume of the alumina powder and the zirconia powder; and the alumina powder accounts for 91.43% of the total volume of the alumina powder and the zirconia powder.

In some embodiments, the zirconia powder is a 3-mol %-yttria-stabilized tetragonal zirconia polycrystalline (3Y-TZP zirconia) powder; and the alumina powder is an α-alumina powder.

In some embodiments, in a microstructure of the grain-grade zirconia toughened alumina ceramic substrate, a grain-size ratio of an alumina grain to a zirconia grain is (2.415-4.444):1.

In some embodiments, in the binary azeotrope of anhydrous ethanol and butanone, a weight ratio of the anhydrous ethanol to the butanone is 1:(1-1.2).

In a second aspect, the present disclosure provides a method for preparing the grain-grade zirconia toughened alumina ceramic substrate mentioned above, comprising:

(1) adding the alumina powder, the zirconia powder, the magnesia-aluminum spinel powder, the solvent and the dispersant into a ball mill followed by a primary ball milling for 24-48 h; and adding the binder and the plasticizer into the ball mill followed by a secondary ball milling for 48 h to obtain a mixture; and (2) subjecting the mixture to vacuum degassing to obtain a casting slurry with a viscosity of 20,000-24,000 mPa s; subjecting the casting slurry to tape casting on a casting machine to obtain a green body; cutting the green body by a punching die followed by pressureless sintering in a furnace at 1600-1630° C. for 3-6 h to obtain the grain-grade zirconia toughened alumina ceramic substrate.

Compared to the prior art, this disclosure has the following beneficial effects.

1. According to the Weaire-Phelan structure that minimizes the surface energy structure to solve the Kelvin problem, a formula, in which the critical volume percentage of $ZrO_2$ is inversely proportional to the cube of the $Al_2O_3$/$ZrO_2$ particle size ratio, is derived and can be used for designing a two-phase ceramic material. It can be concluded that a suitable volume percentage of zirconia in the ZTA ceramic is 3.30-17.56%, and the particle size ratio of alumina grain to zirconia grain is (2.415-4.444):1.

2. A formula for calculating the critical volume percentage of $ZrO_2$ is derived according to the cubic close packing principle, and the optimal content of $ZrO_2$ is directly calculated to be 8.57%. When the particle size ratio of $ZrO_2$ grain to $Al_2O_3$ grain is 0.414, the content of $ZrO_2$ is 2.86%; when the particle size ratio of $ZrO_2$ grain to $Al_2O_3$ grain is 0.225, the content of $ZrO_2$ is 5.71%, realizing the closest packing under grain gradation. A ZTA ceramic substrate prepared based on this model has a bending strength of 816 MPa and a volume resistivity of 6.9×1010 Ω·cm at 600° C., which can simultaneously meet the mechanical and electrical performance requirements of the copper-clad ceramic substrate and heating element.

3. Magnesium-aluminum spinel is used as a sintering aid in the two-phase composite material of alumina and zirconia, which reduces the sintering temperature and widens the sintering temperature range, reducing the energy consumption and being conducive to industrial production.

DETAILED DESCRIPTION OF EMBODIMENTS

Figure 1:
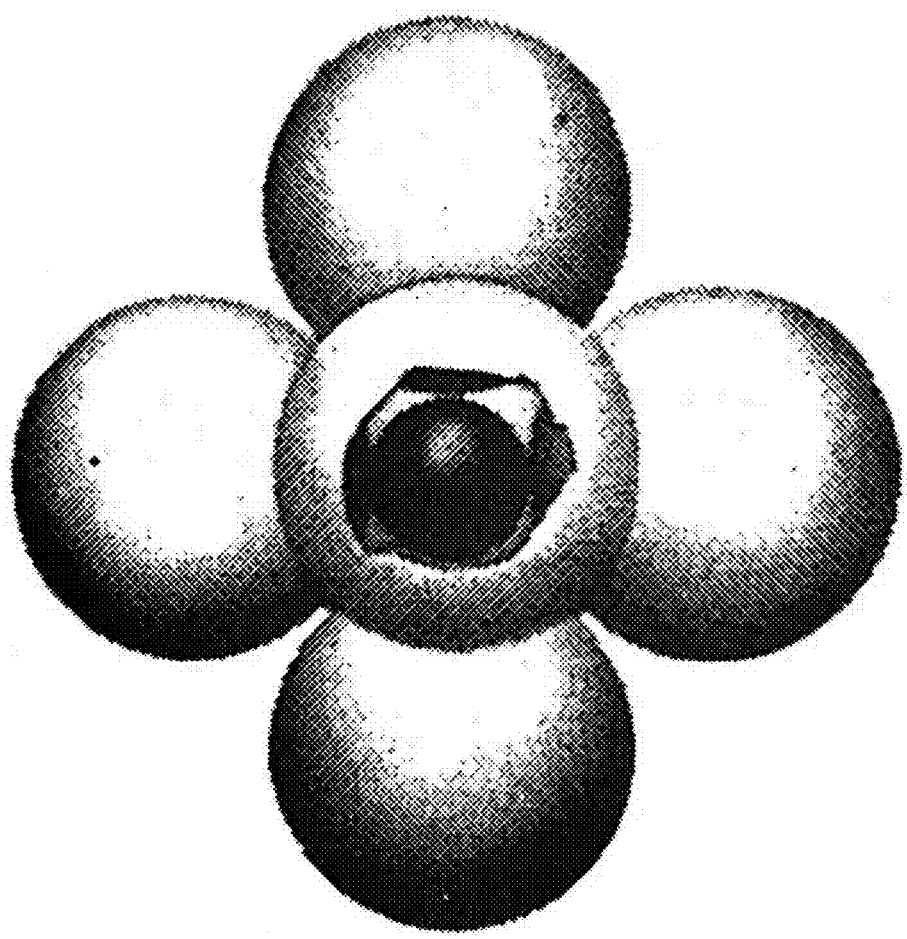
FIG. 1 partially depicts octahedral interstices in a cubic crystal structure of a zirconia toughened alumina (ZTA) ceramic according to an embodiment of the disclosure.

The present disclosure will be further described in detail below with reference to the embodiments, but these embodiments are not intended to limit the scope of this disclosure.

Example 1

A zirconia-doped alumina ceramic substrate was prepared herein, where an alumina powder was used as a main phase material; a zirconia powder was used as a secondary phase material; a magnesia-alumina spinel powder was used as a sintering aid; a binary azeotrope of anhydrous ethanol and butanone was used as a solvent; a phosphate ester was used as a dispersant; polyvinyl butyral was used as a binder; and dibutyl phthalate was used as a plasticizer.

Specifically, a 3-mol %-yttria-stabilized tetragonal zirconia polycrystalline (3Y-TZP) powder (particle size: 0.25 μm), an α-alumina powder (particle size: 0.7 μm) and the magnesia-alumina spinel powder together constituted an inorganic powder, where a volume ratio of the 3Y-TZP powder to the α-alumina powder was 3.30:96.7, and the magnesia-alumina spinel powder was 0.1% of a total weight of the 3Y-TZP powder and the α-alumina powder. The inorganic powder, the binary azeotrope and the phosphate ester were added into a ball mill, and subjected to primary ball milling for 24 h, where the binary azeotrope was 20% by weight of the inorganic powder, and the phosphate ester was 0.5% by weight of the inorganic powder. Then the polyvinyl butyral and the dibutyl phthalate were added into the ball mill, and the mixture in the ball mill was subjected to secondary ball milling for 48 h, where the polyvinyl butyral was 5% by weight of the inorganic powder, and the dibutyl phthalate was 2% by weight of the inorganic powder. The mixture was discharged from the ball mill, and then subjected to vacuum degassing to obtain a casting slurry with a viscosity of 20,000 mPa s. The casting slurry was subjected to tape casting on a casting machine to obtain a casting green body, which was sintered at 1600° C. for 3 h to obtain the ceramic substrate with a size of 138×190×0.32 mm.

Example 2

A zirconia-doped alumina ceramic substrate was prepared herein, where an alumina powder was used as a main phase material; a zirconia powder was used as a secondary phase material; a magnesia-alumina spinel powder was used as a sintering aid; a binary azeotrope of anhydrous ethanol and butanone was used as a solvent; a phosphate ester was used as a dispersant; polyvinyl butyral was used as a binder; and dibutyl phthalate was used as a plasticizer.

Specifically, a 3-mol %-yttria-stabilized tetragonal zirconia polycrystalline (3Y-TZP) powder (particle size: 0.25 µm), an α-alumina powder (particle size: 0.7 µm) and the magnesia-alumina spinel powder together constituted an inorganic powder, where a volume ratio of the 3Y-TZP powder to the α-alumina powder was 8:92, and the magnesia-alumina spinel powder was 2% of a total weight of the 3Y-TZP powder and the α-alumina powder. The inorganic powder, the binary azeotrope and the phosphate ester were added into a ball mill, and subjected to primary ball milling for 32 h, where the binary azeotrope was 25% by weight of the inorganic powder, and the phosphate ester was 1.0% by weight of the inorganic powder. Then the polyvinyl butyral and the dibutyl phthalate were added into the ball mill, and the mixture was subjected to secondary ball milling for 48 h, where the polyvinyl butyral was 8% by weight of the inorganic powder, and the dibutyl phthalate was 4% by weight of the inorganic powder. The mixture was discharged from the ball mill, and then subjected to vacuum degassing to obtain a casting slurry with a viscosity of 22,000 mPa·s. The casting slurry was subjected to tape casting on a casting machine to obtain a casting green body, which was sintered at 1610° C. for 4 h to obtain the ceramic substrate with a size of 138×190×0.32 mm.

Example 3

A zirconia-doped alumina ceramic substrate was prepared herein, where an alumina powder was used as a main phase material; a zirconia powder was used as a secondary phase material; a magnesia-alumina spinel powder was used as a sintering aid; a binary azeotrope of anhydrous ethanol and butanone was used as a solvent; a phosphate ester was used as a dispersant; polyvinyl butyral was used as a binder; and dibutyl phthalate was used as a plasticizer.

Specifically, a 3-mol %-yttria-stabilized tetragonal zirconia polycrystalline (3Y-TZP) powder (particle size: 0.25 µm), an α-alumina powder (particle size: 0.7 µm) and the magnesia-alumina spinel powder together constituted an inorganic powder, where a volume ratio of the 3Y-TZP powder to the α-alumina powder was 13:87, and the magnesia-alumina spinel powder was 3% of a total weight of the 3Y-TZP powder and the α-alumina powder. The inorganic powder, the binary azeotrope and the phosphate ester were added into a ball mill, and subjected to primary ball milling for 40 h, where the binary azeotrope was 30% by weight of the inorganic powder, and the phosphate ester was 1.5% by weight of the inorganic powder. Then the polyvinyl butyral and the dibutyl phthalate were added into the ball mill, and the mixture was subjected to secondary ball milling for 48 h, where the polyvinyl butyral was 12% by weight of the inorganic powder, and the dibutyl phthalate was 5% by weight of the inorganic powder. The mixture was discharged from the ball mill, and then subjected to vacuum degassing to obtain a casting slurry with a viscosity of 24,000 mPa s. The casting slurry was subjected to tape casting on a casting machine to obtain a casting green body, which was sintered at 1630° C. for 5 h to obtain the ceramic substrate with a size of 138×190×0.32 mm.

Example 4

A zirconia-doped alumina ceramic substrate was prepared herein, where an alumina powder was used as a main phase material; a zirconia powder was used as a secondary phase material; a magnesia-alumina spinel powder was used as a sintering aid; a binary azeotrope of anhydrous ethanol and butanone was used as a solvent; a phosphate ester was used as a dispersant; polyvinyl butyral was used as a binder; and dibutyl phthalate was used as a plasticizer.

Specifically, a 3-mol %-yttria-stabilized tetragonal zirconia polycrystalline (3Y-TZP) powder (particle size: 0.25 µm), an α-alumina powder (particle size: 2.0 µm) and the magnesia-alumina spinel powder together constituted an inorganic powder, where a volume ratio of the 3Y-TZP powder to the α-alumina powder was 17.56:82.44, and the magnesia-alumina spinel powder was 4% of a total weight of the 3Y-TZP powder and the α-alumina powder. The inorganic powder, the binary azeotrope and the phosphate ester were added into a ball mill, and subjected to primary ball milling for 48 h, where the binary azeotrope was 35% by weight of the inorganic powder, and the phosphate ester was 2.0% by weight of the inorganic powder. Then the polyvinyl butyral and the dibutyl phthalate were added into the ball mill, and the mixture was subjected to secondary ball milling for 48 h, where the polyvinyl butyral was 15% by weight of the inorganic powder, and the dibutyl phthalate was 6% by weight of the inorganic powder. The mixture was discharged from the ball mill, and then subjected to vacuum degassing to obtain a casting slurry with a viscosity of 24,000 mPa s. The casting slurry was subjected to tape casting on a casting machine to obtain a casting green body, which was sintered at 16130° C. for 6 h to obtain the ceramic substrate with a size of 138×190×0.32 mm.

Mechanical and electrical properties of the ZTA ceramic substrates with a thickness of 0.32 mm prepared in Examples 1-4 were measured, and the results were shown in Table 1.

Table 1 Properties of zirconia-doped alumina ceramic substrates

| $V_z$/ % | Relative density/ % | Bending strength/MPa | 25° C. Volume resistivity/($\Omega \cdot$ cm) |
|---|---|---|---|
| 3.3 | 99.32 | 545 | $3.7 \times 10^{15}$ |
| 8 | 99.56 | 754 | $2.3 \times 10^{15}$ |
| 13 | 99.39 | 802 | $1.2 \times 10^{15}$ |
| 17.56 | 99.68 | 852 | $4.2 \times 10^{14}$ |

Table 1 shows that when the volume percentage of $ZrO_2$ is between 3.3-17.56%, the room-temperature volume resistivities of the ZTA ceramics are all greater than $10^{14}$ $\Omega \cdot$cm, which meets the requirements of thick-film integrated circuit ceramic substrates for the room-temperature volume resistivity. As the volume percentage of $ZrO_2$ increases, the bending strength of the ZTA ceramic gradually increases from 545 MPa to 852 MPa, which meets the requirements of ZTA ceramic substrates for mechanical strength.

In the ZTA ceramic provided herein, the volume percentage of zirconia is 3.30-17.56%; the volume percentage of alumina is 82.44-96.7%; and a g particle size ratio of alumina grain to zirconia grain is 2.415-4.444. The above-mentioned volume ratios are selected according to FIGS. 1-2, where FIG. 1 partially depicts octahedral interstices in a cubic crystal structure, and FIG. 2 partially depicts tetrahedral interstices in a cubic crystal structure.

Figure 2:
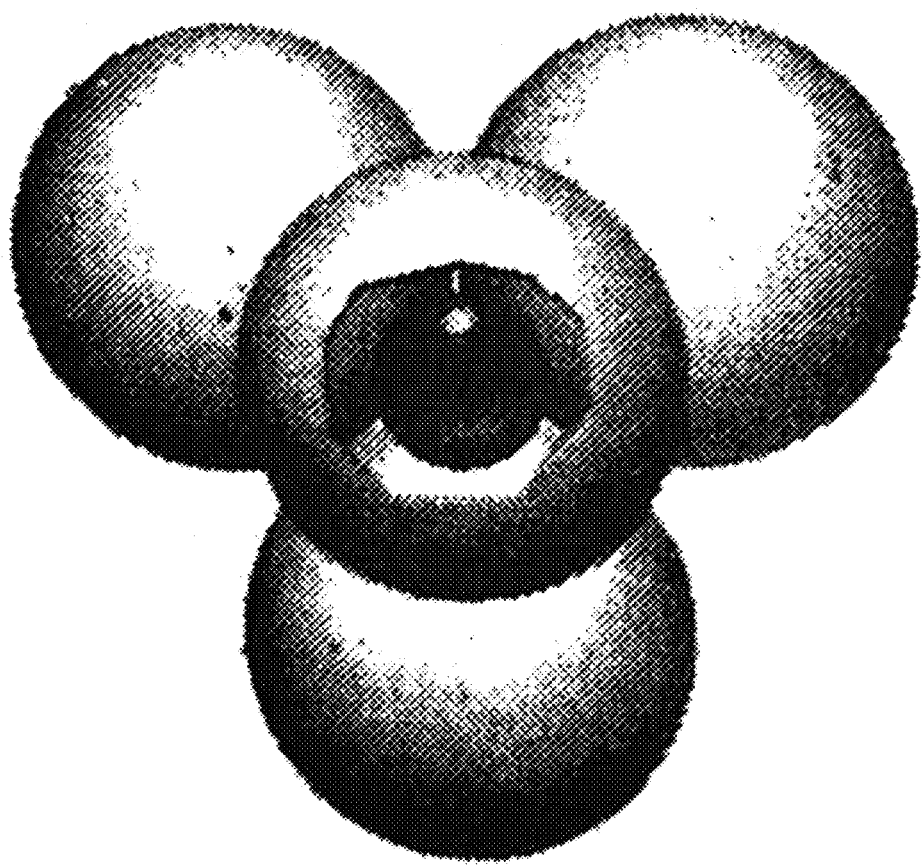
FIG. 2 partially depicts tetrahedral interstices in the cubic crystal structure of the ZTA ceramic according to an embodiment of the disclosure.

As shown in FIGS. 1-2, the stable ion arrangement corresponds to a state of the crystal structure with the lowest energy. Cubic close packing leads to a stable structure with the largest packing density, reaching 74 vol %. Each layer of balls is in cubic form, and the upper layer is placed in the gap of the lower layer to form a close-packed structure. Each ball has twelve closest balls. If each ball grows at a constant speed and fills the gap, each ball will grow into a dodecahedron. According to the face-centered cubic stacking diagram, there are four atoms, four octahedral interstices and eight tetrahedral interstices in each unit cell.

According to Pauling's first rule, the number of anions around the cation in the crystal structure is determined by the diameter ratio of the two types of ions. In the ZTA ceramic green body, it is assumed that both alumina particles and zirconia particles are spherical and arranged in cubic close packing. In a basic unit, there are four alumina particles with a diameter of $D_a$; four zirconia particles are filled into the octahedral interstices with a diameter of $D_{zo}$, and another eight zirconia particles are filled into the tetrahedral interstices with a diameter of $D_{zt}$.

According to the Pythagorean theorem, it is calculated that $D_{zo}/D_a=0.414$. In the same way, in the tetrahedral interstice surrounded by 4 spheres, the $D_{zt}/D_a$ is calculated to be 0.225.

Ceramic powder has high surface free energy. Under the action of high temperature, the excess surface energy of the powder becomes the driving force for sintering, such that the powder is prone to grow into a polyhedral-crystal combination with the smallest surface energy. According to the principle of minimizing surface energy, in an ideal state, the microstructure of the ZTA ceramic after sintering should be similar to the Weaire-Phelan structure. According to the Weaire-Phelan structure, in a basic unit, there are two alumina grains and six zirconia grains. Assuming that the volume fraction of zirconia particles is $V_z$, the volume fraction of zirconia grains in the ZTA ceramic is calculated according to formula (1):

$$V_z = \frac{6 \times \frac{\pi}{6} D_z^3}{6 \times \frac{\pi}{6} D_z^3 + 2 \times \frac{\pi}{6} D_a^3}. \tag{1}$$

Further, the formula (1) is simplified into formula (2):

$$V_z = \frac{1}{1 + \frac{1}{3}\left(\frac{D_a}{D_z}\right)^3}. \tag{2}$$

$D_{zt}/D_a=0.225$ (that is, $D_a/D_{zt}=4.444$) is substituted into the formula (2) to obtain $V_z=3.30\%$.

$D_{zo}/D_a=0.414$ (that is, $D_a/D_{zo}=2.415$) is substituted into the formula (2) to obtain $V_z=17.56\%$.

In the ZTA ceramic, an optimal volume percentage of zirconia is 8.57%, and accordingly, the volume percentage of alumina is 91.43%; and a particle size ratio of the alumina grain to the zirconia grain is 2.415-4.444. In this case, the zirconia exhibits sufficient toughening effect on the alumina, such that ZTA has good mechanical performance; meanwhile, the zirconia grains are fully isolated by alumina grains, and thus the ZTA has good electrical insulation properties, especially at high temperature.

This phenomenon is explained as follows.

According to the cubic close packing, in a basic unit of the ZTA ceramic, there are four alumina particles with a diameter of $D_a$; four zirconia particles are filled into the octahedral interstices with a diameter of $D_{zo}$, and another eight zirconia particles are filled into the tetrahedral interstices with a diameter of $D_{zt}$. In view of this, the volume fraction of the zirconia grains is calculated according to formula (3):

$$V_z = \frac{4 \times \frac{\pi}{6} D_{zo}^3 + 8 \times \frac{\pi}{6} D_{zt}^3}{4 \times \frac{\pi}{6} D_{zo}^3 + 8 \times \frac{\pi}{6} D_{zt}^3 + 4 \times \frac{\pi}{6} D_a^3}. \tag{3}$$

Further, the formula (3) is simplified into formula (4):

$$V_z = \frac{1}{1 + \frac{1}{\left(\frac{D_{zo}}{D_a}\right)^3 + 2 \times \left(\frac{D_{zt}}{D_a}\right)^3}}. \tag{4}$$

$D_{zt}/D_a=0.225$ and $D_{zo}/D_a=0.414$ are substituted into the formula (4) to obtain $V_z=8.57\%$.

Figure 3:
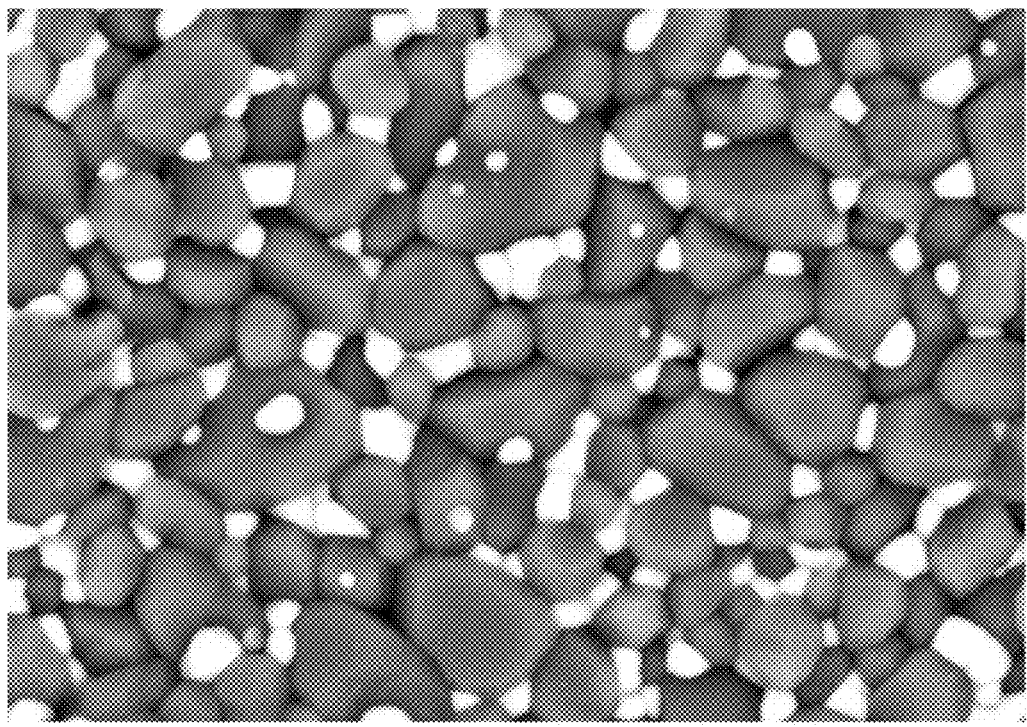
FIG. 3 is a scanning electron microscope (SEM) backscattered-electron image of a surface of a ZTA ceramic substrate with 8% (v/v) of $ZrO_2$.
Figure 4:
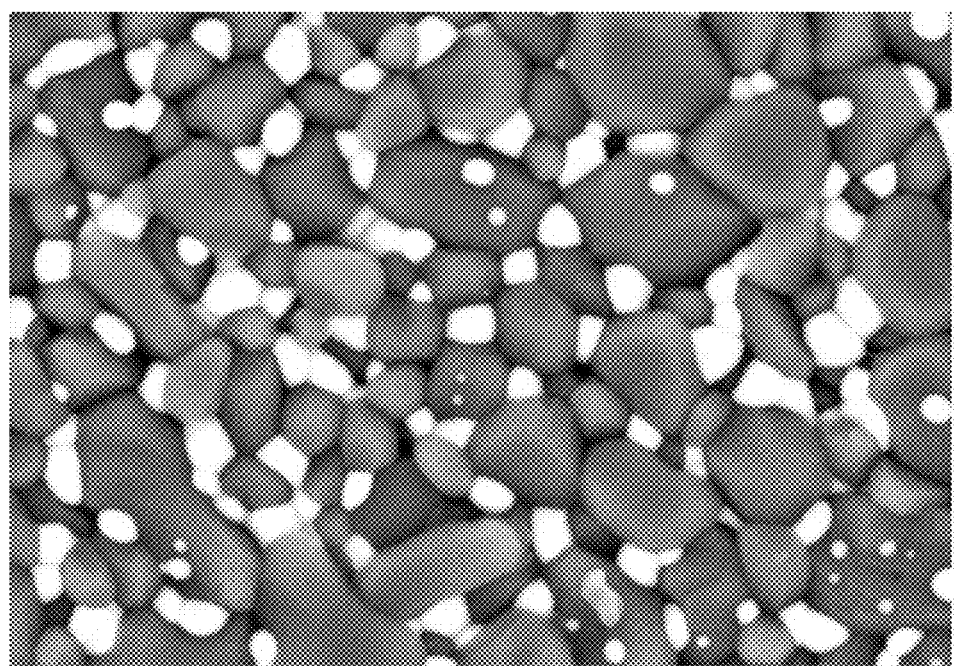
FIG. 4 is a SEM backscattered-electron image of a surface of a ZTA ceramic substrate with 13% (v/v) of $ZrO_2$.

In the microstructure of the ZTA ceramic substrate, the particle size ratio of alumina grain to zirconia grain is 2.415-4.444, where a particle size of the alumina grain is 1.5-2.8 μm, and a particle size of the zirconia grain is 0.6-0.65 μm. FIGS. 3-4 respectively show the scanning electron microscope (SEM) backscattered-electron images of surfaces of ZTA ceramic substrates with different contents of $ZrO_2$, where FIG. 3 is a SEM backscattered-electron image of a surface of a ZTA ceramic substrate with 8% (v/v) of $ZrO_2$, and FIG. 4 is a SEM backscattered-electron image of a surface of a ZTA ceramic substrate with 13% (v/v) $ZrO_2$.

Figure 5:
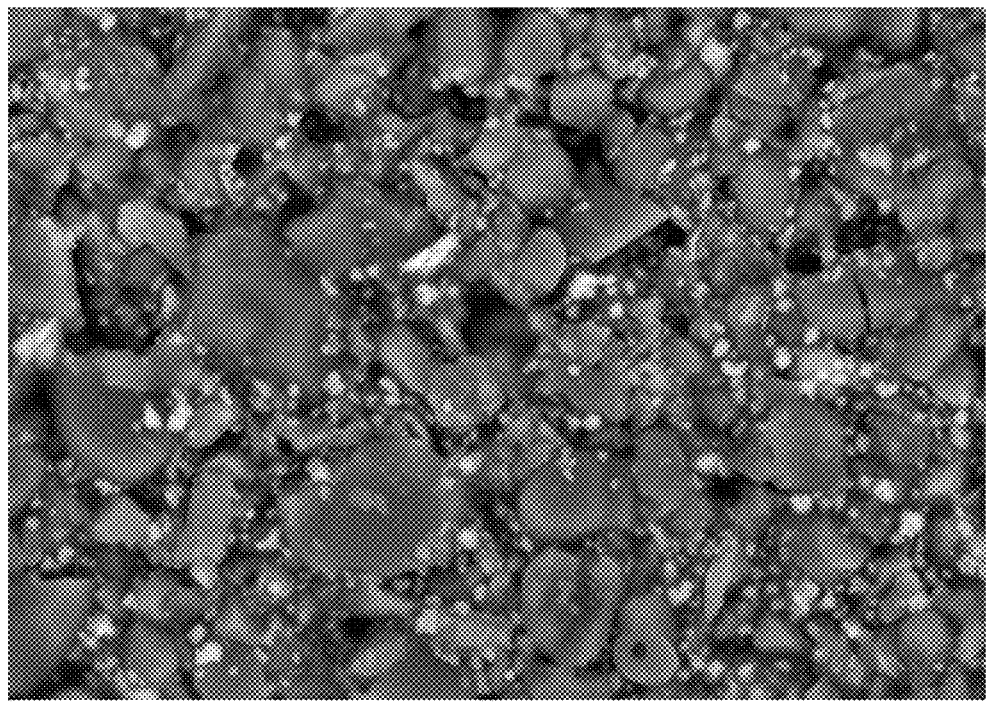
FIG. 5 is a SEM backscattered-electron image of a casting green body of a ZTA ceramic with 8.57% (v/v) of $ZrO_2$.
Figure 6:
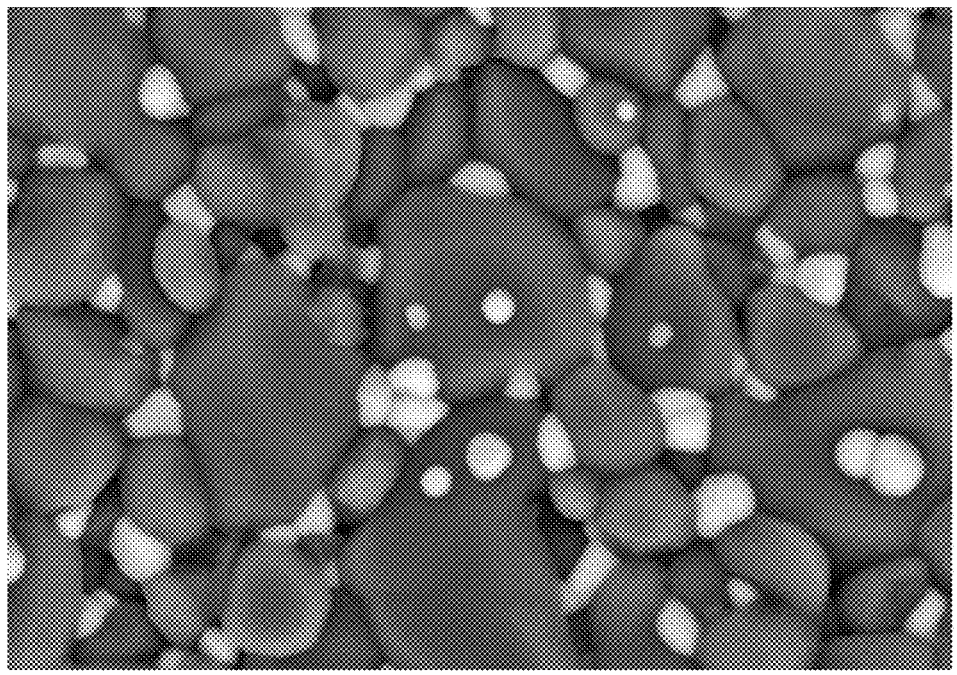
FIG. 6 is a SEM backscattered-electron image of a surface of a ZTA ceramic substrate with 8.57% (v/v) of $ZrO_2$.

FIG. 5 is a SEM backscattered-electron image of a casting green body of a ZTA ceramic with 8.57% (v/v) of $ZrO_2$. FIG. 6 is a SEM backscattered-electron image of a surface of a ZTA ceramic substrate with 8.57% (v/v) of $ZrO_2$. It can be seen from FIG. 5 that an average particle size of the $ZrO_2$ powder is 0.25 μm; and two types of $Al_2O_3$ powders are added, one with an average particle size of 0.7 μm and the other with an average particle size of 2.0 μm. FIG. 6 is the backscattered image of the ZTA ceramic substrate in which the ceramic powder in the green body is grown into crystals by sintering. The particle size of $ZrO_2$ grain is 0.65 μm. There are also two sizes of $Al_2O_3$ grains, one with an average particle size of 1.55 μm, and the other with an average particle size of 2.85 μm. A diameter ratio of the $ZrO_2$ grain to the $Al_2O_3$ grain is basically in line with a diameter ratio of the cubic-packed sphere to the tetrahedral interstice and the octahedral interstice.

Application Example

Figure 7:
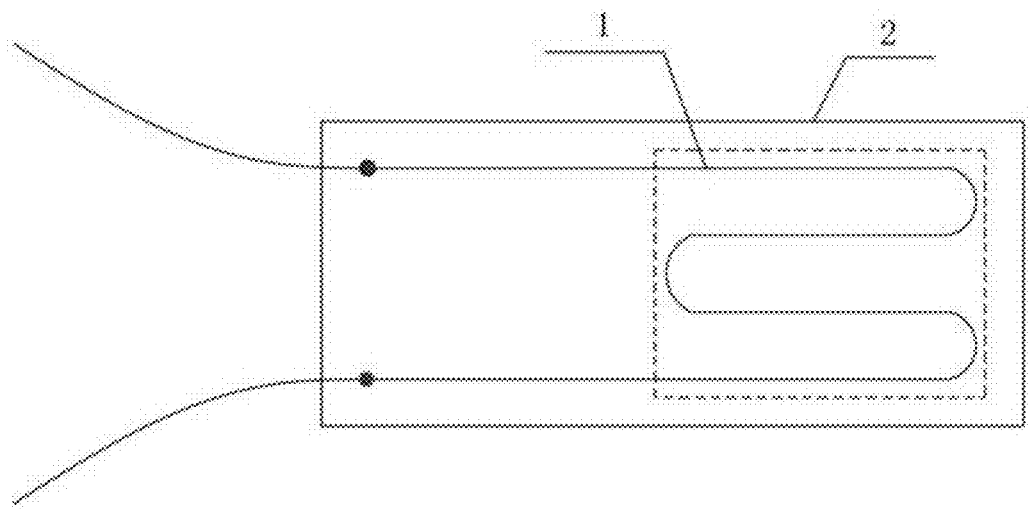
FIG. 7 shows power-on test results of a ZTA ceramic heating sheet in accordance with an embodiment of the present disclosure after working for 60 seconds.
Figure 8:
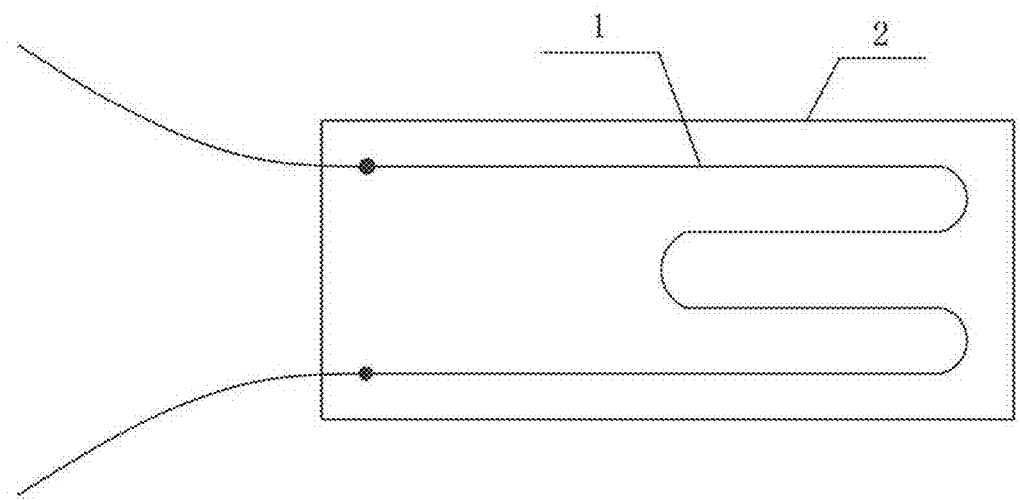
FIG. 8 shows power-on test results of the ZTA ceramic heating sheet in accordance with an embodiment of the present disclosure after working for 60 seconds and being cooled.
Figure 9:
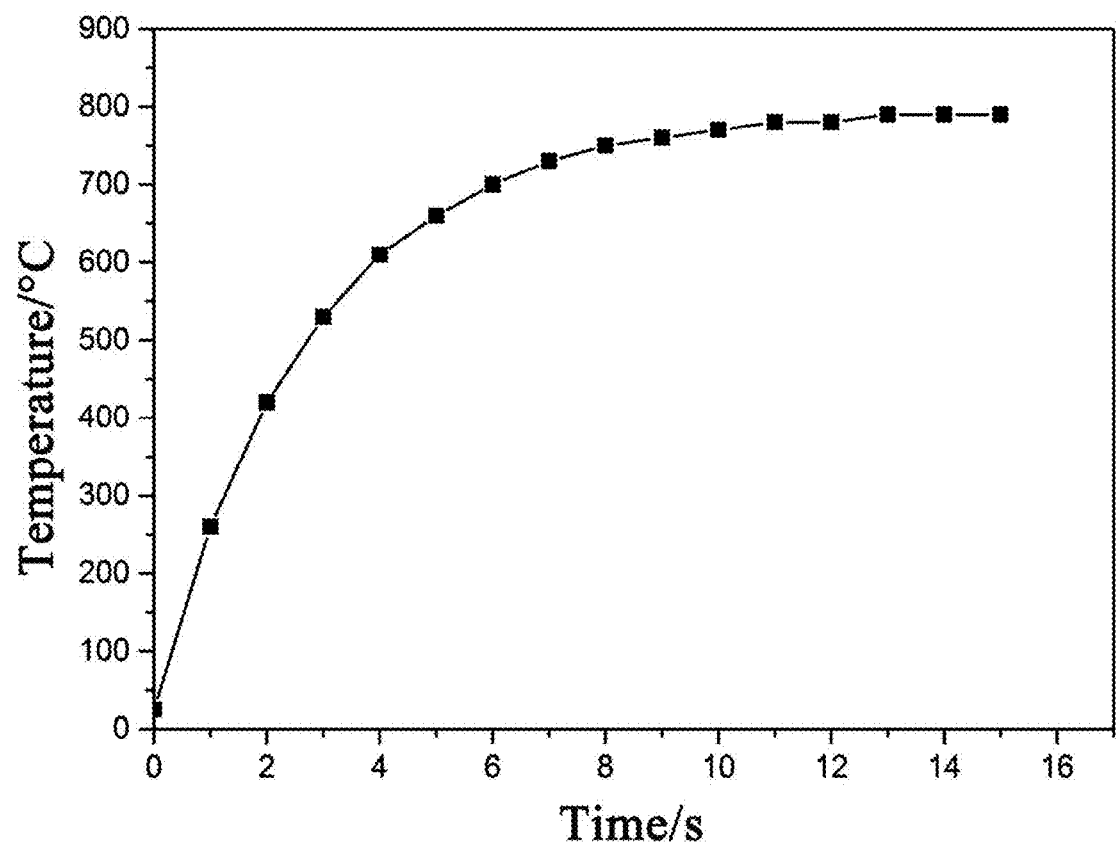
FIG. 9 depicts a change of a surface temperature of a ZTA ceramic heating sheet with 8.57% (v/v) of $ZrO_2$ in accordance with an embodiment of the present disclosure over time.

FIGS. 7-8 showed the power-on test results of the ZTA ceramic heating sheet. A platinum resistance paste was screen printed on the ZTA casting green body with 8.57% (v/v) of $ZrO_2$, and then covered with a green body of the same size for laminating. The laminated product was subjected to warm isostatic press at 95° C., and then was sintered at 1600° C. to obtain a high-temperature co-fired ceramic heating element with a size of 19×4.7×0.38 mm; a heating section length of 10.5 mm; and an average resistance of 1.25Ω. When a 8V voltage was applied to the heating element, the power-on starting power was 51.2 W, which indicated that the specific volume power that the ZTA ceramic heating sheet can withstand during cold start was 1508 W/cm³, while the specific volume power that the ordinary alumina ceramic heating sheet can withstand during cold start was generally not more than 500 W/cm³. A bending strength of a ZTA ceramic heating sheet 2 was twice that of an ordinary alumina ceramic heating sheet, and during cold start, the specific volume power the ZTA ceramic heating sheet can withstand was three times the specific volume power that the ordinary alumina ceramic heating sheet can withstand. The ZTA heating test sheet was energized for 60 seconds, and the test results were shown in FIGS. 7-8. FIG. 7 illustrated power-on test results of a ZTA ceramic heating sheet 2 with 8.57% (v/v) of $ZrO_2$ after heated for 60 seconds, where an area in a dashed box in FIG. 7 was red. FIG. 8 illustrated power-on test results of the ZTA ceramic heating sheet 2 with 8.57% (v/v) of $ZrO_2$ after being heated for 60 seconds and cooled, where an area outside a heating wire 1 in FIG. 8 was yellow. FIG. 9 depicted a change of a surface temperature of a ZTA ceramic heating sheet with 8.57% (v/v) of $ZrO_2$ over time.

After energized for 3 seconds, the temperature of the ZTA ceramic heating sheet 2 with 8.57% (v/v) of $ZrO_2$ rose to 536° C., indicating that the ZTA ceramic heating sheet 2 had high power and fast heating speed. The temperature change curve with time was shown in FIG. 9. After being energized for 15 seconds, the ZTA ceramic heating sheet kept the surface temperature at about 792° C., and gaps between the heating wires 1 can be clearly observed (as shown in FIG. 7). As shown in FIG. 8, after being cooled, the ZTA ceramic heating sheet had no black spots appearing between the heating wires 1, indicating that the high-temperature volume resistivity of the ZTA ceramic heating sheet 2 with 8.57% (v/v) of $ZrO_2$ met the requirements of ceramic substrates for insulation performance.

What is claimed is:

1. A grain-grade zirconia toughened alumina ceramic substrate, wherein the grain-grade zirconia toughened alumina ceramic substrate is prepared from a main phase material and a secondary phase material in a solvent in the presence of a sintering aid, a dispersant, a binder and a plasticizer;
   the main phase material is an alumina powder;
   the secondary phase material is a zirconia powder;
   the sintering aid is a magnesia-alumina spinel powder;
   the solvent is a binary azeotrope of anhydrous ethanol and butanone;
   the dispersant is a phosphate ester;
   the binder is polyvinyl butyral;
   the plasticizer is dibutyl phthalate;
   the alumina powder accounts for 82.44-96.7% of a total volume of the alumina powder and the zirconia powder, and the zirconia powder accounts for 3.30-17.56% of the total volume of the alumina powder and the zirconia powder;
   a weight of the magnesia-alumina spinel powder is 0.1-4.0% of a total weight of the alumina powder and the zirconia powder;
   the alumina powder, the zirconia powder and the magnesia-aluminum spinel powder constitute an inorganic powder;
   the binary azeotrope of anhydrous ethanol and butanone is 20-35% by weight of the inorganic powder;
   the phosphate ester is 0.5-2.0% by weight of the inorganic powder;
   the polyvinyl butyral is 5-15% by weight of the inorganic powder;
   the dibutyl phthalate is 2-6% by weight of the inorganic powder; and
   in a microstructure of the grain-grade zirconia toughened alumina ceramic substrate, a grain size ratio of an alumina grain to a zirconia grain is 2.145-4.444.

2. The grain-grade zirconia toughened alumina ceramic substrate of claim 1, wherein the zirconia powder accounts for 8.57% of the total volume of the alumina powder and the zirconia powder; and the alumina powder accounts for 91.43% of the total volume of the alumina powder and the zirconia powder.

3. The grain-grade zirconia toughened alumina ceramic substrate of claim 1, wherein the zirconia powder is a 3-mol %-yttria-stabilized tetragonal zirconia polycrystalline (3Y-TZP) powder; and the alumina powder is an α-alumina powder.

4. The grain-grade zirconia toughened alumina ceramic substrate of claim 1, wherein in the binary azeotrope of anhydrous ethanol and butanone, a weight ratio of the anhydrous ethanol to the butanone is 1:(1-1.2).

5. A method for preparing the grain-grade zirconia toughened alumina ceramic substrate of claim 1, comprising:
   (1) adding the alumina powder, the zirconia powder, the magnesia-aluminum spinel powder, the solvent and the dispersant into a ball mill followed by a primary ball milling for 24-48 h; and adding the binder and the plasticizer into the ball mill followed by a secondary ball milling for 48 h to obtain a mixture; and
   (2) subjecting the mixture to vacuum degassing to obtain a casting slurry with a viscosity of 20000-24000 mPa s; subjecting the casting slurry to tape casting on a casting machine to obtain a green sheet; cutting the green sheet by a punching die followed by pressureless sintering in a furnace at 1600-1630° C. for 3-6 h to obtain the grain-grade zirconia toughened alumina ceramic substrate.

\* \* \* \* \*